Oct. 15, 1940.  M. B. HERBRICK  2,218,382
TRACTION DEVICE
Filed March 5, 1938
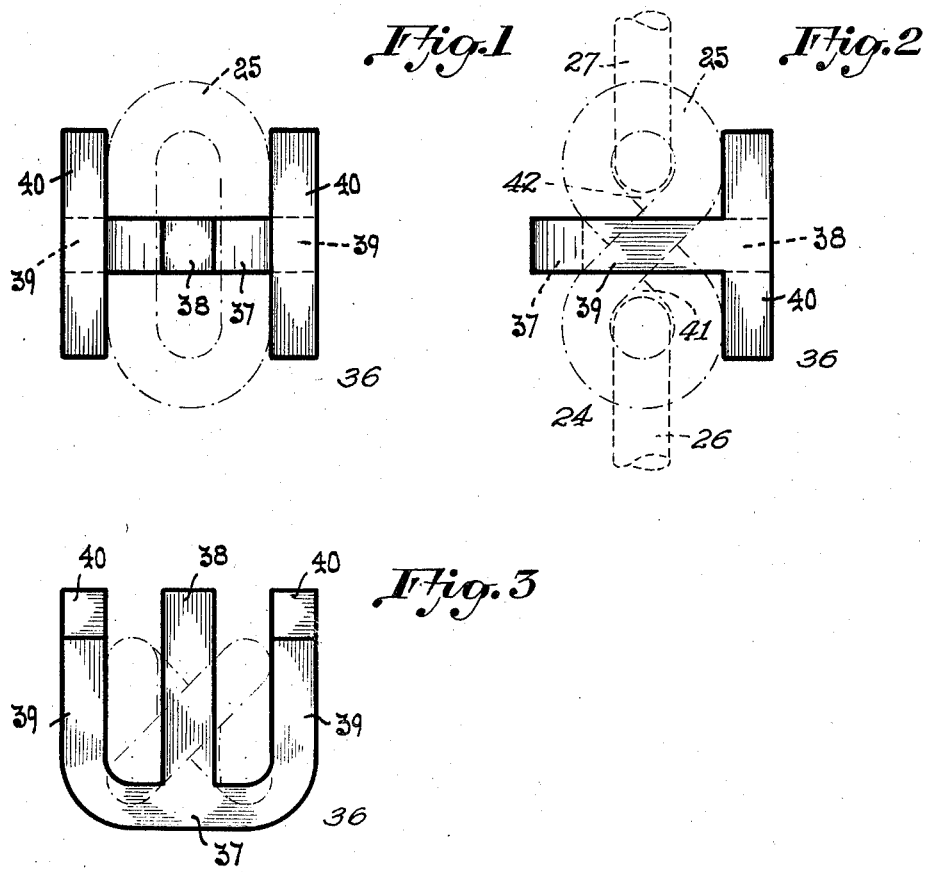
Inventor
M. B. Herbrick
By Arthur H. Sturges
Attorney Patented Oct. 15, 1940

2,218,382

UNITED STATES PATENT OFFICE 2,218,382

TRACTION DEVICE

Milton B. Herbrick, Omaha, Nebr.

Application March 5, 1938, Serial No. 194,128

1 Claim. (Cl. 152—245)

This invention relates to traction devices and more particularly to anti-skid cross chains for the tires of motor vehicles and has for an object to provide cross chain links so constructed and assembled that when said links are joined together to form a cross chain that the latter is provided with reversible wearing side surfaces for providing cross chains having long wearing characteristics.

Another object of the invention is to provide an anti-skid device having lugs disposed so that the vehicle is provided with adequate traction while traveling in a forward direction and skidding in a direction lateral to the line of travel is resisted.

A further object of the invention is to provide a shank reinforcement extending transversely through the openings of each of the links of the cross chain and to weld the shanks to the links for insuring that said diagonally disposed lugs remain rigidly attached to their respective links at all times before the lugs are worn away through use.

A still further object of the invention is to provide a link for the cross chains of anti-skid tire chains which, in use, will not rupture the fabric of an automobile tire when the weight of the motor vehicle is applied to the link and the latter is between said tire and the roadway.

A particular object of the invention is to provide cross chain links which are so constructed and assembled into a chain that the links are adapted to have free pivotal turning movements with respect to each other while at the same time each link is prevented from having sliding movements with respect to and longitudinally of a next adjacent link for maintaining a chain formed of the links longitudinally extended to substantially the entire length of the chain at all times and during all conditions of use.

Other and further objects and advantages of the invention will be understood from the following detailed description thereof, reference being had to the accompanying drawing in which:

Figure 1 is a top plan view of a roadway engaging member of the traction chain of the present invention, a twisted link of said chain being represented by dotted lines.

Figure 2 is a side view of said member and link and showing the latter connected to next adjacent links of said chain, said next adjacent links being represented fragmentarily by means of dotted lines.

Figure 3 is an end view of said member.

Referring now to the drawing for a more particular description, a cross chain of the present invention employs a hook at each end thereof, said hooks being conventional whereby said chain may be attached to and removed from the conventional side chains which are disposed in use against the side walls of a pneumatic tire of a motor vehicle in a well known manner.

The cross chains such as the chain generally indicated at 24 are formed of elongated "twist" links such as the link 25, the ends of said links being closed whereby initially the links are of elongated O-shape in plan having an opening between the sides thereof. By "twist" link is meant that the oppositely disposed ends of each link are turned at an angle of substantially or approximately 45 degrees with respect to the other end thereof, whereby in use the links are adapted to bear evenly against the surface of the tire and roadway and to be substantially in a common plane.

The roadway engaging member shown in full lines in Figures 1 to 3 inclusive, said member being generally indicated at 36, includes a main body portion 37 which is substantially E-shaped in plan, as best shown in Figure 3. The tongue or shank portion 38 of the E is formed integral with said main body portion, being medially disposed with respect to the arms 39 thereof. The arms 39 are equi-distantly spaced from and disposed in parallelism with said tongue-shank 38.

The outer ends of the arms 39 are each provided with a transversely disposed bar 40. The ends of the bars 40 are equi-distantly spaced from the arms 39. The surfaces of the bars 40 which are furthest from the main body portion 37 are disposed substantially in alignment with the outer end of the shank 38, as best shown in Figure 3.

The medially disposed tongue-shank 38 extends through the link 25 and substantially mid-way between the ends thereof, being welded thereto, whereby the device or member 36 is secured to the link 25 in the relative position with respect to said link, as shown in Figures 1 to 3.

As shown in Figure 3, ends of next adjacent links 26 and 27 are joined to the link 25 at each end of the latter. The links 26 and 27 are of twisted type and similar to the link 25, being disposed through the openings 41 and 42, respectively, said openings being provided by and between the inner wall of the link 25 and the shank 38, whereby the links 26 and 27 are adapted to have pivotal movements with respect to the link 25 and similarly the next adjacent links which are connected to the links 26 and 27 are adapted to have said pivotal movements, all of said links being prevented from unduly sliding longitudinally with respect to each other since, as shown in Figure 2, the openings 41 and 42 are of substantially the same area in plan as the cross sectional area of the body portion of said links. Especially said sliding movements are prevented at times when the links of the traction chain of the present invention are each provided with one of the described E-shaped members whereby said chain is maintained extended substantially its entire length at all times which is of advantage during application of such cross chains to the wheel tire of a vehicle.

As thus described it will be understood that the traction chain of the present invention includes a plurality of elongated twisted links such as the links 25, 26 and 27; that each link carries a protective roadway engaging member or device; that each of said members includes a substantially E-shaped main body portion 37 having a medially disposed shank portion 38 extending through the opening in a link midway between the ends of the link, the shank portion being welded to the link for permitting relative pivotal movements and preventing relative sliding movements of each link with respect to a next adjacent link. The main body portion 37 also having a pair of arms 39 disposed at opposite ends of said main body portion and extending in the same direction as the shank portion 38, said arms being of a length less than that of said shank portion, each of said arms 39 being substantially parallel with said shank portion 38 and spaced equi-distantly therefrom, the outer free end of each arm having a transversely disposed bar 40, the ends of each bar being equi-distantly spaced from its supporting arm 39, each bar being of a thickness such that its outer surface lies in alignment with or substantially flush with the outer surface or outer end of said shank portion 38, the oppositely disposed arms 39 being extended over the outer surfaces of the link 25 and the bars and said shank portion being disposed outwardly of the outside of the link and that as thus described, said members thereby engage the roadway and prevent the links from coming into contact with the roadway, said chain being flexible enough to conform to the arcuate cross sectional contour of a tire.

Among other advantages of the invention noise generated through use is reduced to a minimum since the chains of the present invention are prevented from contracting longitudinally when loosely applied to a wheel tire.

It is obvious that various changes and modifications may be made in the details of construction and design of the above specifically described embodiment of this invention without departing from the spirit thereof, such changes and modifications being restricted only by the scope of the invention as hereinafter claimed.

I claim:

A traction chain comprising a plurality of elongated twisted links joined together for relative pivotal movement and a plurality of roadway engaging members carried by said links, each of said members comprising a substantially E-shaped main body portion having a medially disposed shank portion extending through the opening in a link midway between the ends of the link, said shank portion being welded to said link for permitting relative pivotal movements and preventing relative sliding movements of each link with respect to a next adjacent link, said main body portion also having a pair of arms disposed at opposite ends of said body portion and extending in the same direction as said shank portion, said arms being of a length less than that of said shank portion, each of said arms being parallel with said shank portion and spaced equi-distantly therefrom, the ends of the arms of said E-shaped member being provided with transversely disposed bars, the ends of each bar being equi-distantly spaced from its supporting arm, each bar being of such a thickness that its outer surface lies flush with the outer face of said shank portion, the oppositely disposed arms being extended over the outer surfaces of the link and the bars and shank portion being disposed outwardly of the outside of the link, thereby engaging the roadway and preventing the link from coming into contact with the roadway.

MILTON B. HERBRICK.